(12) United States Patent
Kowta et al.

(10) Patent No.: US 10,740,168 B2
(45) Date of Patent: Aug. 11, 2020

(54) SYSTEM MAINTENANCE USING UNIFIED COGNITIVE ROOT CAUSE ANALYSIS FOR MULTIPLE DOMAINS

(71) Applicant: International Business Machines Corporation, Armonk, NY (US)

(72) Inventors: Ramshanker Kowta, Bangalore (IN); Ruchi Mahindru, Elmsford, NY (US); Awadesh Tiwari, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 15/939,414

(22) Filed: Mar. 29, 2018

(65) Prior Publication Data
US 2019/0303228 A1      Oct. 3, 2019

(51) Int. Cl.
| | | |
|---|---|---|
| *G06F 11/00* | (2006.01) | |
| *G06F 11/07* | (2006.01) | |
| *G06F 11/34* | (2006.01) | |
| *H04L 12/24* | (2006.01) | |
| *G06N 3/02* | (2006.01) | |
| *G05B 17/02* | (2006.01) | |

(52) U.S. Cl.
CPC ........ *G06F 11/079* (2013.01); *G06F 11/0715* (2013.01); *G06F 11/0751* (2013.01); *G06F 11/0793* (2013.01); *G06F 11/3409* (2013.01); *G06N 3/02* (2013.01); *H04L 41/145* (2013.01); *G05B 17/02* (2013.01)

(58) Field of Classification Search
CPC ............... G06F 11/079; G06F 11/0715; G06F 11/0793; G06F 11/3409; G06F 11/3447; G06F 11/3452
See application file for complete search history.

(56) References Cited

U.S. PATENT DOCUMENTS

| | | | | |
|---|---|---|---|---|
| 8,078,552 | B2 * | 12/2011 | Kaushal ............. | G05B 13/0265 706/12 |
| 8,417,715 | B1 * | 4/2013 | Bruckhaus ............. | G06Q 10/04 707/758 |
| 8,732,534 | B2 * | 5/2014 | Kini .................... | G06F 11/0766 714/47.1 |
| 8,762,951 | B1 * | 6/2014 | Kosche ............... | G06F 11/3476 717/127 |

(Continued)

*Primary Examiner* — Elmira Mehrmanesh
(74) *Attorney, Agent, or Firm* — Yee & Associates, P.C.

(57) ABSTRACT

A computer-implemented method, system, and non-transitory computer program product for maintaining a system. A domain of the system is identified. Problem information identifying a problem in the system is captured. Key performance indicators are obtained from a historical model database for the identified domain. An unsupervised model is applied to the key performance indicators to identify historical solutions to historical problems that are similar to the problem in the system. A linear complexity model is used to identify potential solutions for the problem as an historical solution for each historical problem that has the lowest combination of time-cost complexity, resource-cost complexity, and recurrence frequency for the historical problem. A real-time objective function is used to select a solution to the problem from the potential solutions. A maintenance operation to be performed on the system to implement the solution and fix the problem is identified.

20 Claims, 4 Drawing Sheets

(56) References Cited

U.S. PATENT DOCUMENTS

| | | | |
|---|---|---|---|
| 9,058,265 B2* | 6/2015 | Behrendt | G06F 11/0793 |
| 9,092,802 B1 | 7/2015 | Akella | |
| 9,104,572 B1 | 8/2015 | Thompson et al. | |
| 9,223,667 B2* | 12/2015 | Sanford | G06N 20/00 |
| 9,413,685 B1 | 8/2016 | Lam et al. | |
| 9,449,278 B2* | 9/2016 | Davlos | G06N 5/04 |
| 9,477,963 B2* | 10/2016 | Kar | G06F 17/2705 |
| 9,589,229 B2* | 3/2017 | Deng | G06N 7/005 |
| 9,916,194 B2* | 3/2018 | Pang | G06F 11/079 |
| 10,412,155 B2* | 9/2019 | Kumar | H04L 67/1023 |
| 2008/0091628 A1* | 4/2008 | Srinivasa | G06N 3/08 |
| | | | 706/12 |
| 2008/0270363 A1* | 10/2008 | Hunt | G06F 16/2462 |
| 2011/0314331 A1* | 12/2011 | Beach | G06F 11/0739 |
| | | | 714/26 |
| 2014/0142766 A1* | 5/2014 | Tiwari | G05B 23/0272 |
| | | | 700/286 |
| 2014/0189702 A1* | 7/2014 | Yan | G06F 9/5027 |
| | | | 718/104 |
| 2015/0186779 A1 | 7/2015 | Deng et al. | |
| 2015/0379430 A1* | 12/2015 | Dirac | G06N 20/00 |
| | | | 706/12 |
| 2016/0132372 A1* | 5/2016 | Anderson | G06F 11/079 |
| | | | 714/15 |
| 2016/0321115 A1* | 11/2016 | Thorpe | H04L 47/823 |
| 2017/0371305 A1* | 12/2017 | Tiwari | G06N 20/00 |
| 2018/0039914 A1* | 2/2018 | Menahem | G06Q 10/20 |
| 2018/0082207 A1* | 3/2018 | Cormier | G06F 16/27 |
| 2018/0192303 A1* | 7/2018 | Hui | H04W 24/04 |
| 2019/0028909 A1* | 1/2019 | Mermoud | H04W 24/08 |
| 2019/0095515 A1* | 3/2019 | Buesser | G06N 3/082 |
| 2019/0230046 A1* | 7/2019 | Djukic | H04L 47/76 |

* cited by examiner

SYSTEM MAINTENANCE USING UNIFIED COGNITIVE ROOT CAUSE ANALYSIS FOR MULTIPLE DOMAINS

BACKGROUND INFORMATION

1. Field

The present disclosure relates generally to systems and methods for determining the root cause of problems for maintain systems in various domains.

2. Background

Root cause analysis (RCA) is a method of problem solving used for identifying the root causes of faults or problems. A factor is considered a root cause if removal thereof prevents a final undesirable outcome from recurring. In contrast, a merely causal factor is one that affects the outcome of an event but is not a root cause of the event. Removing a causal factor may benefit an outcome, however, it does not prevent its recurrence with certainty. Root cause analysis may be applied to methodically identify and correct the root cause of events, rather than to simply address a symptomatic result. Focusing correction on root causes has the goal of entirely preventing the recurrence of problems.

Accurate and timely root cause analysis is desirable in many domains to prevent recurring problems. For example, in the information technology domain, recurring problems with the delivery of information technology services may lead to customer dissatisfaction and potential service level agreement penalties.

Various systems and methods currently exist for root cause analysis of problems in systems in various domains. However, such systems and methods may not be able to identify the root cause of problems accurately or in a sufficiently timely manner.

SUMMARY

The illustrative embodiments provide a computer-implemented method of maintaining a system. A domain of the system is identified. Problem information identifying a problem in the system is captured. Key performance indicators are obtained from a historical model database for the identified domain. An unsupervised model is applied to the key performance indicators to identify historical solutions to historical problems that are similar to the problem in the system. Time-cost complexity and resource-cost complexity of the historical solutions are determined. A linear complexity model is used to identify potential solutions for the problem as an historical solution for each historical problem that has the lowest combination of time-cost complexity, resource-cost complexity, and recurrence frequency for the historical problem. A real-time objective function is used to select a solution to the problem from the potential solutions. A maintenance operation to be performed on the system to implement the solution and fix the problem is identified.

The illustrative embodiments also provide an apparatus for maintaining a system, comprising an operator interface, a historical model database, an unsupervised model, a linear complexity model, and an objective function generator. The operator interface is configured to receive a selected domain of the system and operator provided problem information identifying a problem in the system. The historical model database comprises key performance indicators for the selected domain. The unsupervised model is configured to be applied to the key performance indicators to identify historical solutions to historical problems that are similar to the problem in the system. The linear complexity model is configured to identify potential solutions for the problem as an historical solution for each historical problem that has the lowest combination of time-cost complexity, resource-cost complexity, and recurrence frequency for the historical problem. The objective function generator is configured to generate a real-time objective function to select a solution to the problem from the potential solutions, wherein the solution identifies a maintenance operation to be performed on the system to implement the solution and fix the problem.

The illustrative embodiments also provide a non-transitory computer-readable storage medium storing program code. When executed by a processor, the program code performs a computer-implemented method of root cause analysis for maintaining a system, comprising identifying a domain of the system, capturing problem information identifying a problem in the system, obtaining key performance indicators from a historical model database, applying an unsupervised model, determining time-cost complexity and resource-cost complexity, applying a linear complexity model, generating a real-time objective function, finding a solution to the problem using a non-linear constraint model, and identifying a maintenance operation to be performed on the system to implement the solution and fix the problem Other variations are possible, as described below.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
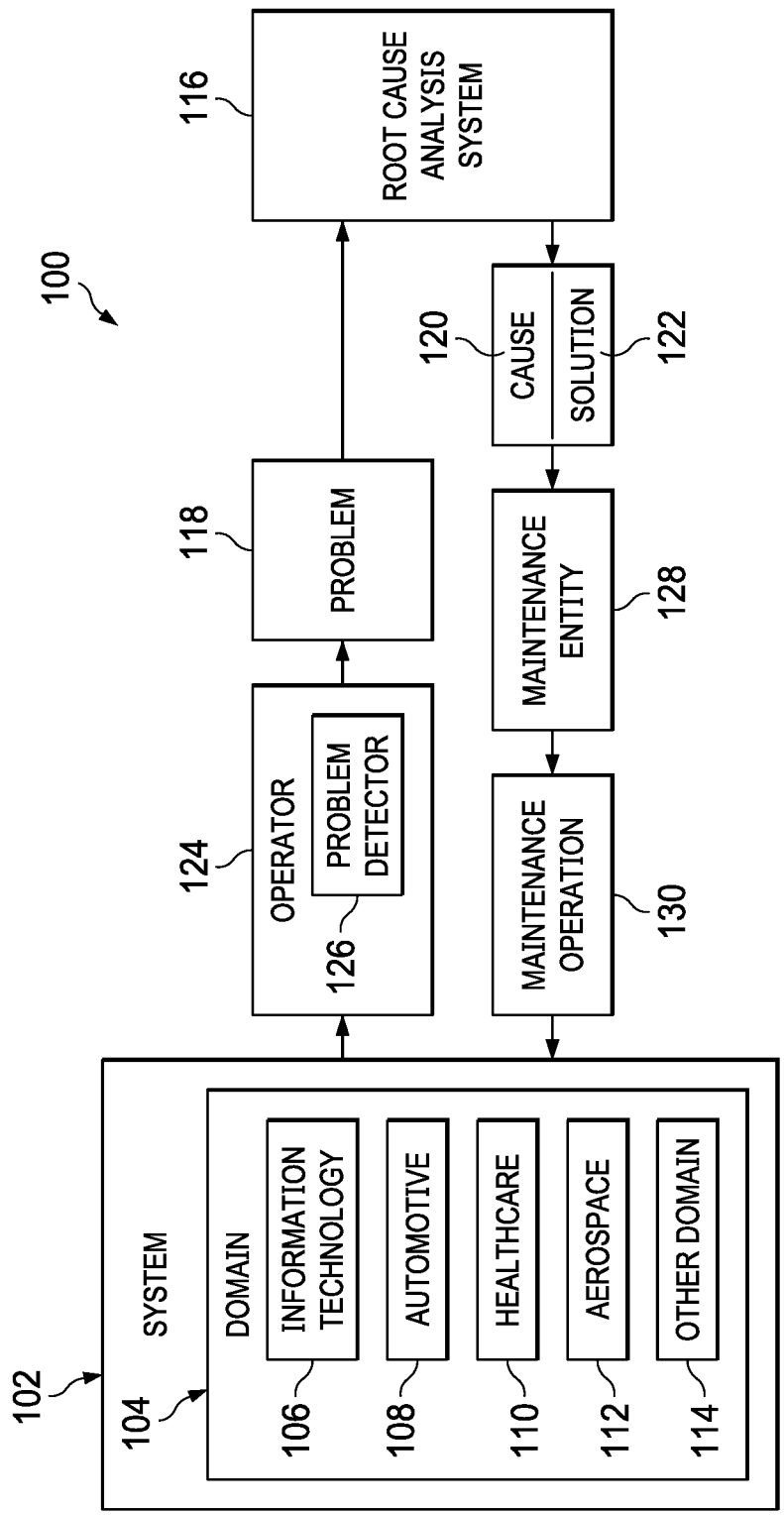
FIG. 1 is a block diagram of a system operating environment in accordance with an illustrative embodiment.

The illustrative embodiments recognize and take into account a variety of considerations. For example, the illustrative embodiments recognize and take into account that problem management analysis may be challenging and tends to be performed by part-time resources, leading to a potentially inefficient and ineffective process. The wealth and breadth of information available for root cause analysis and lack of standardized tools for root cause analysis may make determining insights, trends, and causality from various sources of unstructured, structured, and semi-structured problem management data challenging. For example, some current systems for root cause analysis may require relatively vary large amounts of documents and knowledge sources to build up a body of knowledge in order to find solutions to problems. However, such current systems may address only unstructured data and not time series performance metrics and high frequency data.

Illustrative embodiments also recognize and take into account that that there may be a lack of system thinking in current root cause analysis tools, resulting in inadequacy of structuring the problem by existing tools and taking too long to find the root cause of such problems. For example, a typical root cause analysis study and reporting may currently take three to six months.

Furthermore, most current root cause analysis methods and systems are offline. For example, current root cause analysis in the information technology domain may be an offline process that involves a customer of information technology services logging an issue, a field team taking the request forward, looking at the issue closely, arriving at solutions, and then deploying the solutions based on contract or need or both.

Illustrative embodiments recognize and take into account that current root cause analysis tools may not be generic in nature and applicable for any domain. For example, current root cause analysis tools may be dedicated to specific domains and may not be calibrated or deployed with minimal modifications across domains. Furthermore, current root cause analysis systems may not be cognitive, in that such systems may not be relearning, may not recommend actions to correct problems in an intelligent manner, and may not be predictive.

Illustrative embodiments provide systems and methods that address the above-mentioned limitations and provide additional capabilities that may be of value to system operators and service providers in information technology and various other domains. Illustrative embodiments provide a system and method to achieve real-time root cause analysis to provide the best fix for a problem. Illustrative embodiments provide the most optimal solution to a problem based on current state parameters and what are probable issues that are likely to happen.

Illustrative embodiments take advantage of the potential of existing root cause analysis tools and methods. Illustrative embodiments use a conglomeration of root cause analysis methods provided by various root cause analysis tools to analyze system problems to identify appropriate solutions to those problems.

Illustrative embodiments achieve the results described using various methods. For example, without limitation, illustrative embodiments may generate a four-dimensional objective function in real-time for optimization. Weighting factors may be generated online for cognitive learning for framing the objective functions. Illustrative embodiments may employ a linear complexity model that deploys a combinatorial selection framework to select the best combination of time complexity, resource complexity, and resource frequency for a set of problem-solution combinations. Illustrative embodiments may generate predictive scoring through multivariate logistic regression to help in retraining a deep neural network model.

Turning to FIG. 1, a block diagram of a system operating environment is depicted in accordance with an illustrative embodiment. System operating environment 100 may be any environment in which system 102 may be operated to perform any appropriate function or provide any appropriate service. System 102 may be configured to perform any appropriate number of functions, services, or combination of functions and services in any appropriate domain 104. For example, without limitation, domain 104 may include information technology 106, automotive 108, healthcare 110, aerospace 112, other domain 114, or any appropriate combination of domains.

In accordance with an illustrative embodiment, root cause analysis system 116 may be configured to analyze problem 118 in system 102 to determine cause 120 of problem 118 and to recommend solution 122 to problem 118. For example, operator 124 of system 102 may use problem detector 126 to identify problem 118 in system 102. Operator 124 may then provide information regarding problem 118 to root cause analysis system 116 for analysis. Operator 124 may be a human operator, a machine, or a human that operates system 102 in combination with a machine. Problem detector 126 may include sensors or other systems or methods of various combinations of systems and methods for detecting problem 118 in system 102.

Solution 122 for problem 118 may be provided to maintenance entity 128. Maintenance entity 128 may perform any appropriate maintenance operation 130 on system 102 to fix problem 118.

Figure 2:
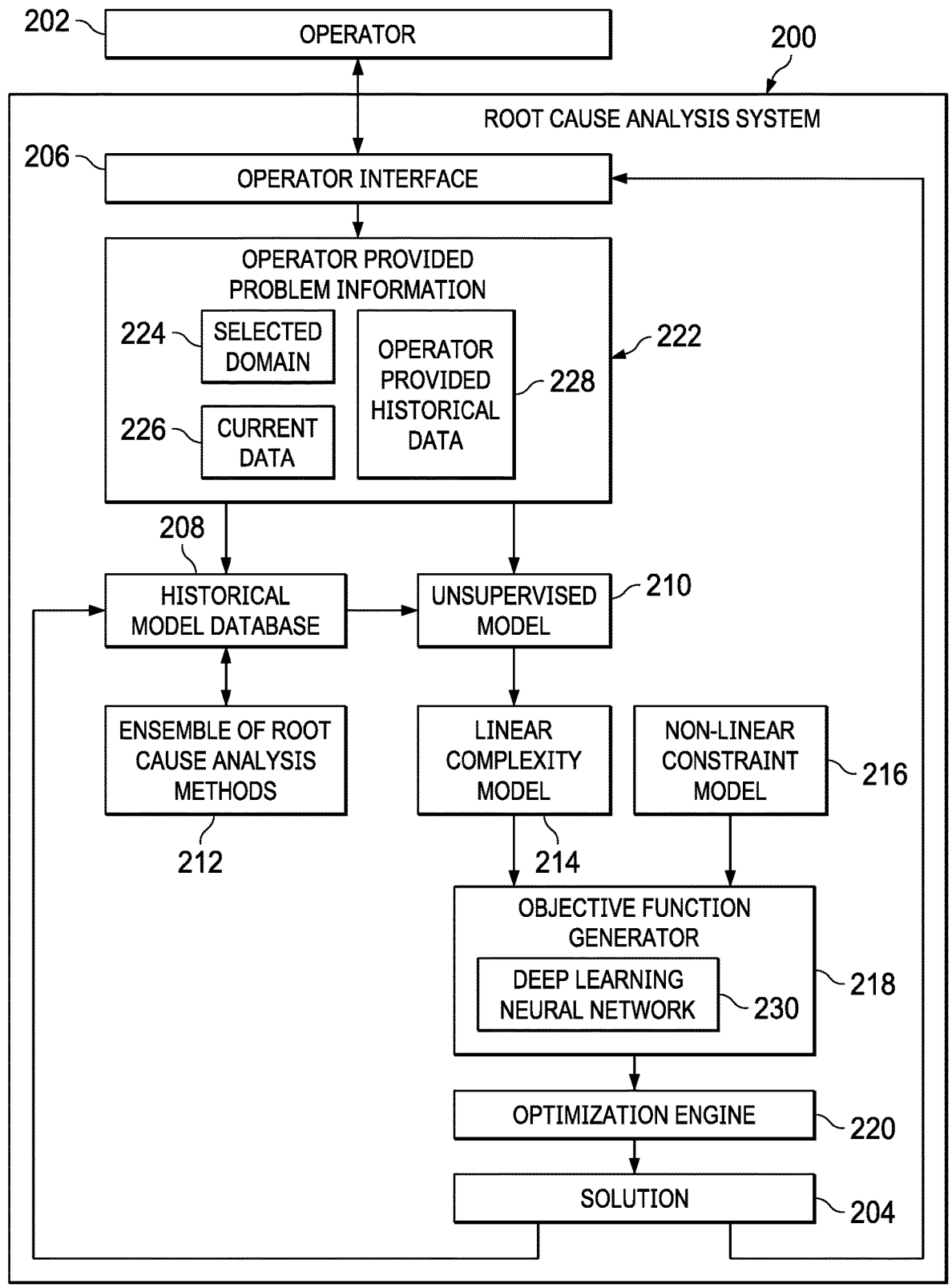
FIG. 2 is a block diagram of a root cause analysis system in accordance with an illustrative embodiment.

Turning to FIG. 2, a block diagram of a root cause analysis system is depicted in accordance with an illustrative embodiment. Root cause analysis system 200 may be an example of one implementation of root cause analysis system 116 in FIG. 1. Root cause analysis system 200 may be used by operator 202 to find solution 204 to a problem in a system in any domain. Root cause analysis system 200 may include operator interface 206, historical model database 208, unsupervised model 210, ensemble of root cause analysis methods 212, linear complexity model 214, non-linear constraint model 216, objective function generator 218, and optimization engine 220.

Operator interface 206 may be configured to receive operator provided problem information 222 from operator 202. For example, without limitation, operator provided problem information 222 may include selected domain 224, current data 226, and operator provided historical data 228. Operator interface 206 also may be configured to display solution 204 to operator 202.

Operator provided problem information 222 may be stored in historical model database 208 and used by root cause analysis system 200 to determine solution 204 in the manner to be described herein. Solution 204 also may be stored in historical model database 208 and used in combination with the other data in historical model database 208 to determine the solution to future problems by root cause analysis system 200.

Historical model database 208 may be created by analyzing historical data and forming it through ensemble of root cause analysis methods 212. For example, without limitation, ensemble of root cause analysis methods 212 may include any appropriate number of the following: complex engine analytics, cause-effect diagram (CED), Kepner-Tragoe, FTA, current reality tree (CRT), 5-whys, Apollo root cause analysis (ARCA), interrelationship diagram, CATWOE, barrier analysis, TRIZ, system process improvement model, causal factor analysis, event-causal chart, Bayesian interference, FMEA, change analysis, rapid problem resolution (RPR), Markov models, drill down tree, swim lane, value stream map, process map, common cause analysis (CCA), other root cause analysis methods, or various combinations of root cause analysis methods. This offline model building block may generate outputs such as problem, corresponding parameters, fixes applied, mean time to repair, time to fix, uptime/downtime, other appropriate outputs, or various combinations of outputs. The model may also take the values of the current performance characteristics to choose potential solutions based on parameters identified from historical models. Potential solutions that are feasible, but not implemented historically, may be identified based on current key performance indicator values.

Objective function generator 218 may comprise deep learning neural network 230.

Figure 3:
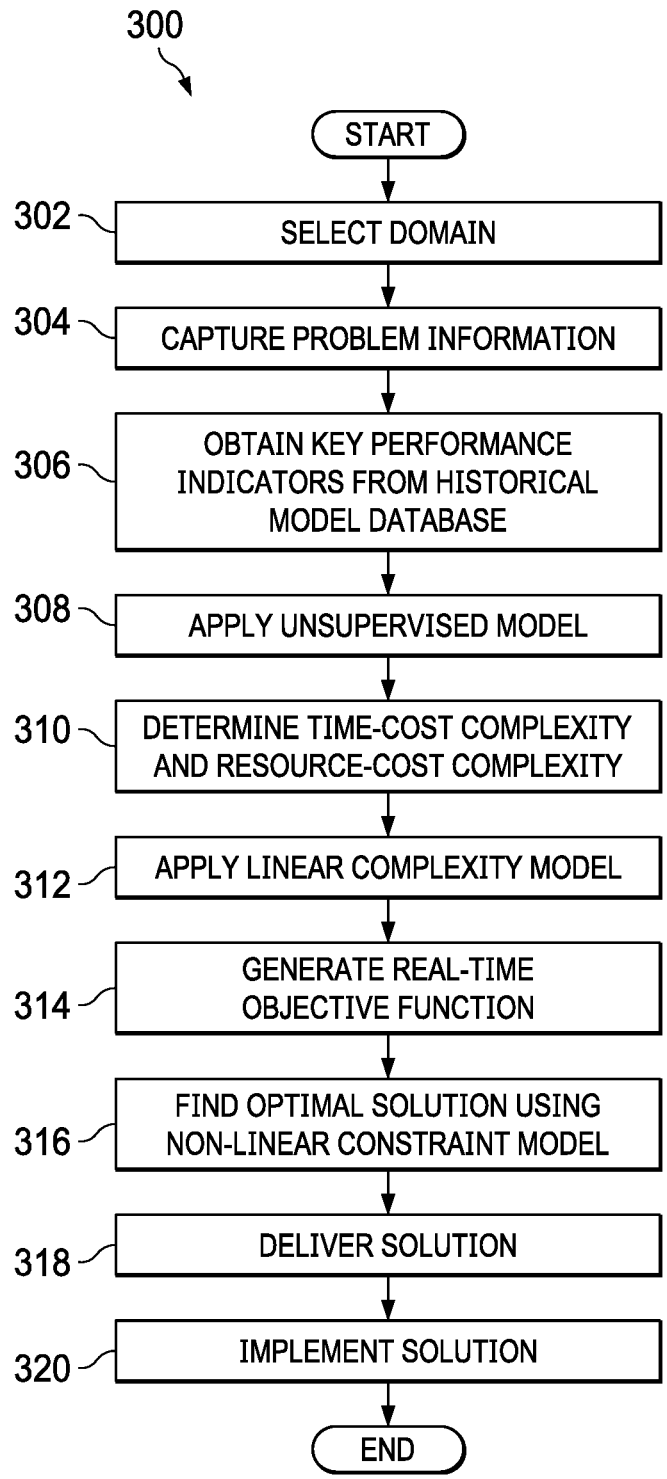
FIG. 3 is an illustration of a flowchart of a process for performing a maintenance operation on a system using root cause analysis in accordance with an illustrative embodiment.

Turning to FIG. 3, an illustration of a flowchart of a process for performing a maintenance operation on a system using root cause analysis is depicted in accordance with an illustrative embodiment. For example, process 300 may be implemented using root cause analysis system 116 in FIG. 1.

Process 300 may begin with selecting a domain by an operator (operation 302). For example, the operator may select the domain of the system to be analyzed using an appropriate operator interface. Problem information then may be captured (operation 304). The intent of the problem may be captured from the current state of the system. For example, without limitation, operation 304 may include capturing real-time performance metrics of the system being analyzed.

Key performance indicators may then be obtained from an historical model database (operation 306). For example, for the selected domain, key performance indicators may be captured from a historical model database created by an offline process as described above.

An unsupervised model then may be applied (operation 308). Operation 308 may comprise building or re-building an unsupervised model based on the retrieved key performance indicators. For a given set of problems and fixes the unsupervised model may generate clusters identifying factors such as time to implement, cost of implementation, resources required, cost attached to resources, mean time to repair, time to fix, uptime/downtime, and the like. Various historical and other solutions may be captured based on the potential parameters impacting it. The solution space then may be reduced dynamically based on the measures of the observed performance metrics.

Time-cost complexity and resource-cost complexity then may be determined (operation 310). Tim-cost complexity may be computed through a non-linear combination of time-to-implement solution and cost-to-implement solution. Similarly, resource-cost complexity may be computed from resources deployed and cost of resources.

A linear complexity model then may be applied (operation 312). The linear complexity model may deploy a combinatorial selection framework to select the best combination of time complexity, resource complexity, and recurrence frequency for problem-solution combinations.

A real-time objective function then may be generated (operation 314). For example, the non-linear complexity model outputs may be taken as inputs to a deep learning neural network that also takes weights as inputs and outputs an objective function value. This objective function may then be input to an optimization algorithm. The weights may be derived dynamically and iteratively. For example, a supervised machine learning model may generate a priority score for a problem-solution combination based on a four-dimensional optimization output. This model may also generate distributions for weight factors w1 . . . w4. For example, w1 follows normal distribution, w2 follows Gaussian distribution, etc. These distributions may be generated from minimum and maximum value possible and Monte Carlo simulations.

An optimal solution then may be determined using a non-linear constraint model (operation 316). The solution then may be delivered to an appropriate maintenance entity (operation 318). The maintenance entity may then perform an appropriate maintenance operation on the system to fix the problem (operation 320), with the process terminating thereafter.

Figure 4:
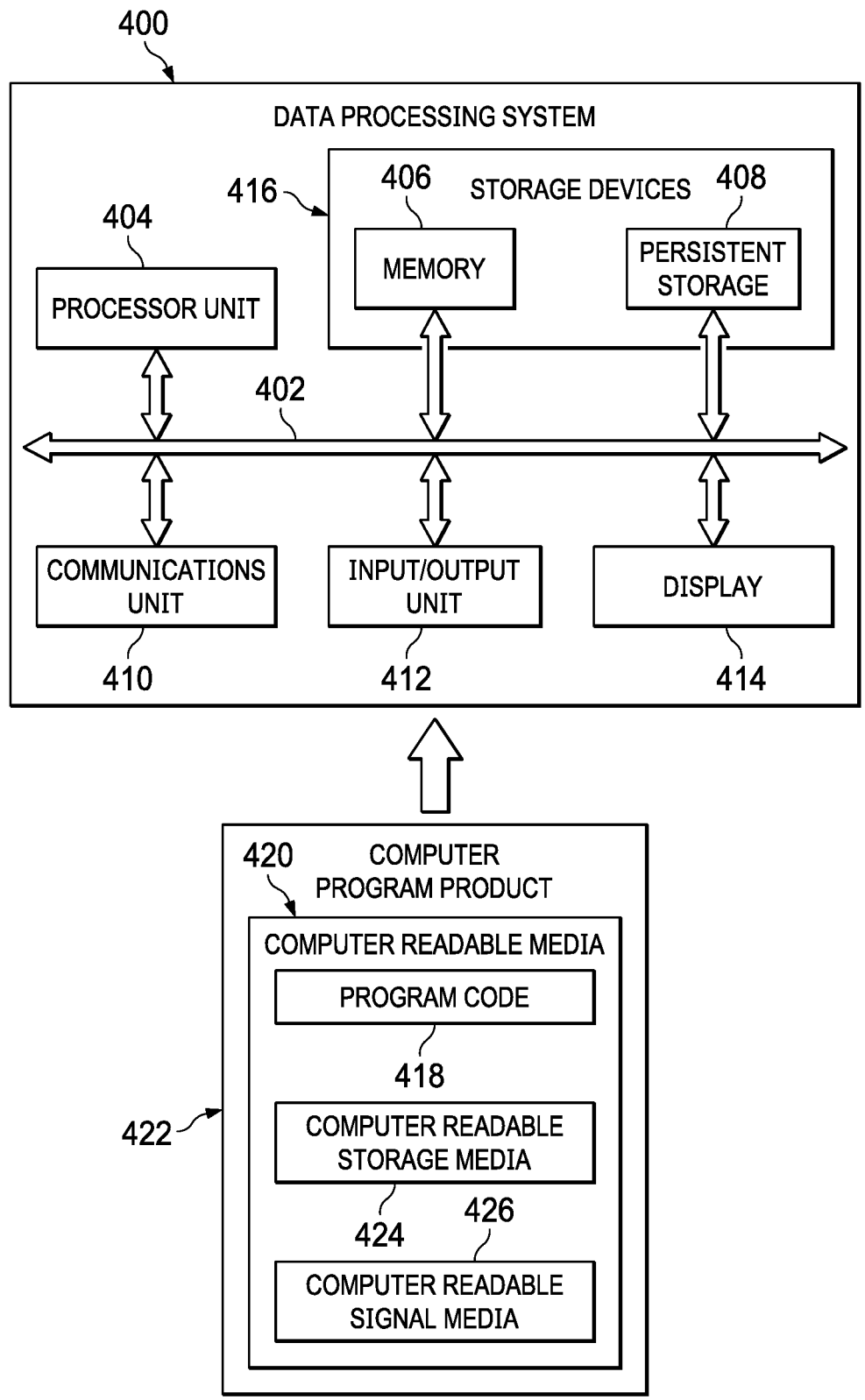
FIG. 4 illustrates a data processing system, in accordance with an illustrative embodiment.

Turning to FIG. 4, a diagram of a data processing system is depicted in accordance with an illustrative embodiment. Data processing system 400 is an example of a system in which computer-readable program code or program instructions implementing processes of illustrative embodiments may be run. Data processing system 400 may be an example of one system in which root cause analysis system 116 in FIG. 1 may be implemented. In this illustrative example, data processing system 400 includes communications fabric 402, which provides communications between processor unit 404, memory 406, persistent storage 408, communications unit 410, input/output unit 412, and display 414.

Processor unit 404 serves to execute instructions for software applications and programs that may be loaded into memory 406. Processor unit 404 may be a set of one or more hardware processor devices or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 406, in these examples, may be, for example, a random access memory, or any other suitable volatile or non-volatile storage device. Persistent storage 408 may take various forms, depending on the particular implementation. For example, persistent storage 408 may contain one or more devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in this example, provides for communication with other computers, data processing systems, and devices via network communications unit 410 may provide communications using both physical and wireless communications links. The physical communications link may utilize, for example, a wire, cable, universal serial bus, or any other physical technology to establish a physical communications link for data processing system 400. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 400.

Input/output unit 412 allows for the input and output of data with other devices that may be connected to data processing system 400. For example, input/output unit 412 may provide a connection for user input through a keypad, keyboard, and/or some other suitable input device. Display 414 provides a mechanism to display information to a user and may include touch screen capabilities to allow the user to make on-screen selections through user interfaces or input data, for example.

Instructions for the operating system, applications, and/or programs may be located in storage devices 416, which are in communication with processor unit 404 through communications fabric 402. In this illustrative example, the instructions are in a functional form on persistent storage 408. These instructions may be loaded into memory 406 for running by processor unit 404. The processes of the different embodiments may be performed by processor unit 404 using computer-implemented program instructions, which may be located in a memory, such as memory 406. These program instructions are referred to as program code, computer-usable program code, or computer-readable program code that may be read and run by a processor in processor unit 404. The program code, in the different embodiments, may be embodied on different physical computer-readable storage devices, such as memory 606 or persistent storage 408.

Program code 418 is located in a functional form on computer-readable media 420 that is selectively removable and may be loaded onto or transferred to data processing system 400 for running by processor unit 404. Program code 418 and computer-readable media 420 form computer program product 422. In one example, computer-readable media 420 may be computer-readable storage media 424 or computer-readable signal media 426. Computer-readable storage media 424 may include, for example, an optical or magnetic disc that is inserted or placed into a drive or other device that is part of persistent storage 408 for transfer onto a storage device, such as a hard drive, that is part of persistent storage 408. Computer-readable storage media 424 also may take the form of a persistent storage, such as a hard drive, a thumb drive, or a flash memory that is connected to data processing system 400. In some instances, computer-readable storage media 424 may not be removable from data processing system 400.

Alternatively, program code 418 may be transferred to data processing system 400 using computer-readable signal media 426. Computer-readable signal media 426 may be, for example, a propagated data signal containing program code 418. For example, computer-readable signal media 426 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 418 may be downloaded over a network to persistent storage 408 from another device or data processing system through computer-readable signal media 426 for use within data processing system 400. For instance, program code stored in a computer-readable storage media in a data processing system may be downloaded over a network from the data processing system to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to, or in place of, those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a computer-readable storage device in data processing system 400 is any hardware apparatus that may store data. Memory 406, persistent storage 408, and computer-readable storage media 424 are examples of physical storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The present invention may be a system, a method, and/or a computer program product. The computer program product may include a computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of maintaining a system, comprising:
   identifying a domain of the system;
   capturing problem information identifying a problem in the system;
   obtaining key performance indicators from a historical model database for the identified domain;
   applying an unsupervised model to the key performance indicators to identify historical solutions to historical problems that are similar to the problem in the system;
   determining time-cost complexity and resource-cost complexity of the historical solutions;
   using a linear complexity model to identify potential solutions for the problem as an historical solution for each historical problem that has the lowest combination of time-cost complexity, resource-cost complexity, and recurrence frequency for the historical problem;
   using a real-time objective function to select a solution to the problem from the potential solutions; and
   identifying a maintenance operation to be performed on the system to implement the solution and fix the problem.

2. The computer-implemented method of claim 1, wherein the domain is selected from the group of domains consisting of information technology, automotive, healthcare, and aerospace.

3. The computer-implemented method of claim 1, wherein capturing the problem information comprises capturing real-time performance metrics of the system.

4. The computer-implemented method of claim 1 further comprising generating the real-time objective function using a neural network.

5. The computer-implemented method of claim 1 further comprising using a non-linear constraint model to select the solution to the problem, wherein the non-linear constraint model applies at least one constraint to selecting the solution to the problem that is selected from the group of constraints consisting of: part availability for the solution, skill level of available personnel for implementing the solution, process limitations, and design limitations of the system.

6. The computer-implemented method of claim 1, wherein the key performance indicators for the historical model database are generated by an offline process using an ensemble of root cause analysis methods.

7. The computer-implemented method of claim 1 further comprising performing the maintenance operation on the system to fix the problem.

8. An apparatus for maintaining a system, comprising:
an operator interface configured to receive a selected domain of the system and operator provided problem information identifying a problem in the system;
a historical model database comprising key performance indicators for the selected domain;
an unsupervised model configured to be applied to the key performance indicators to identify historical solutions to historical problems that are similar to the problem in the system;
a linear complexity model configured to identify potential solutions for the problem as an historical solution for each historical problem that has the lowest combination of time-cost complexity, resource-cost complexity, and recurrence frequency for the historical problem; and
an objective function generator configured to generate a real-time objective function to select a solution to the problem from the potential solutions, wherein the solution identifies a maintenance operation to be performed on the system to implement the solution and fix the problem.

9. The apparatus of claim 8, wherein the wherein the domain is selected from the group of domains consisting of information technology, automotive, healthcare, and aerospace.

10. The apparatus of claim 8, wherein the problem information further comprises real-time performance metrics for the system.

11. The apparatus of claim 8, wherein the objective function generator comprises a neural network.

12. The apparatus of claim 8 further comprising a non-linear constraint model configured to apply at least one constraint to selecting the solution to the problem that is selected from the group of constraints consisting of: part availability for the solution, skill level of available personnel for implementing the solution, process limitations, and design limitations of the system.

13. The apparatus of claim 8, wherein the key performance indicators for the historical model database are generated by an offline process using an ensemble of root cause analysis methods.

14. A non-transitory computer-readable storage medium storing program code, which when executed by a processor, performs a computer-implemented method of maintaining a system, comprising:
identifying a domain of the system;
capturing problem information identifying a problem in the system;
obtaining key performance indicators from a historical model database for the identified domain;
applying an unsupervised model to the key performance indicators to identify historical solutions to historical problems that are similar to the problem in the system;
determining time-cost complexity and resource-cost complexity of the historical solutions;
using a linear complexity model to identify potential solutions for the problem as an historical solution for each historical problem that has the lowest combination of time-cost complexity, resource-cost complexity, and recurrence frequency for the historical problem;
using a real-time objective function to select a solution to the problem from the potential solutions; and
identifying a maintenance operation to be performed on the system to implement the solution and fix the problem.

15. The non-transitory computer-readable storage medium of claim 14, wherein the domain is selected from the group of domains consisting of information technology, automotive, healthcare, and aerospace.

16. The non-transitory computer-readable storage medium of claim 14, wherein the problem information comprises real-time performance metrics.

17. The non-transitory computer-readable storage medium of claim 14, wherein the key performance indicators for the historical model database are generated by an offline process using an ensemble of root cause analysis methods.

18. The non-transitory computer-readable storage medium of claim 14, wherein the real-time objective function is generated using a neural network.

19. The non-transitory computer-readable storage medium of claim 14, wherein the program code, when executed by a processor, further performs the step of using a non-linear constraint model to select the solution to the problem, wherein the non-linear constraint model applies at least one constraint to selecting the solution to the problem that is selected from the group of constraints consisting of: part availability for the solution, skill level of available personnel for implementing the solution, process limitations, and design limitations of the system.

20. The non-transitory computer-readable storage medium of claim 14, wherein the program code, when executed by a processor, further performs the step of performing the maintenance operation on the system to fix the problem.

* * * * *